(12) United States Patent
Argitis (10) Patent No.: US 7,191,726 B2
(45) Date of Patent: Mar. 20, 2007

(54) BOAT PAD AND BOAT PAD ASSEMBLY

(76) Inventor: John J. Argitis, Route 20, P.O. Box 515, Sturbridge, MA (US) 01566

( * ) Notice: Subject to any disclaimer, the term of this patent is extended or adjusted under 35 U.S.C. 154(b) by 0 days.

(21) Appl. No.: 11/177,336

(22) Filed: Jul. 11, 2005

(65) Prior Publication Data

US 2006/0005760 A1 Jan. 12, 2006

Related U.S. Application Data (60) Provisional application No. 60/586,413, filed on Jul. 9, 2004.

(51) Int. Cl.
*B60P 3/10* (2006.01)
(52) U.S. Cl. .................. 114/344; 114/44; 280/414.1
(58) Field of Classification Search ............. 114/44, 114/45, 48, 219, 344, 364; 280/414.1; 405/3, 405/7; 428/119; 474/185
See application file for complete search history.

(56) References Cited

U.S. PATENT DOCUMENTS

| | | | |
|---|---|---|---|
| 3,917,087 A | 11/1975 | Godbersen | |
| 4,227,828 A | 10/1980 | Ivanov et al. | |
| 4,284,409 A * | 8/1981 | Van Teslaar | 474/185 |
| 4,468,150 A | 8/1984 | Price | |
| 4,519,738 A | 5/1985 | Wood | |
| 4,986,571 A | 1/1991 | Godbersen | |
| 5,076,603 A * | 12/1991 | Godbersen | 280/414.1 |
| 5,133,570 A * | 7/1992 | Godbersen | 280/414.1 |
| 5,186,576 A * | 2/1993 | Fournier | 405/7 |
| 5,290,124 A | 3/1994 | Pavlescak | |
| 5,429,383 A * | 7/1995 | Reed | 280/414.1 |
| 5,622,447 A | 4/1997 | Fournier | |
| 5,908,680 A * | 6/1999 | Moren et al. | 428/119 |
| 6,372,323 B1 * | 4/2002 | Kobe et al. | 428/119 |
| 6,610,382 B1 * | 8/2003 | Kobe et al. | 428/119 |
| 2004/0126185 A1 | 7/2004 | Davidson et al. | |

OTHER PUBLICATIONS

International Search Report and Written Opinion dated Jun. 28, 2006.

* cited by examiner

*Primary Examiner*—Lars A. Olson
(74) *Attorney, Agent, or Firm*—Harness, Dickey & Pierce, P.L.C.

(57) ABSTRACT

A boat pad may include a planar member composed of an elastomeric, rubber or like material. The planar member may include a plurality of spaced-apart raised features formed on a surface thereof and which are configured to contact a surface of a water vessel hull as the hull is being supported by a boat stand or boat trailer including the pad.

27 Claims, 8 Drawing Sheets

BOAT PAD AND BOAT PAD ASSEMBLY

CROSS-REFERENCE TO RELATED APPLICATIONS

This application claims priority under 35 U.S.C. §119(e) to U.S. Provisional Patent Application Ser. No. 60/586,413, filed Jul. 9, 2004 to John J. Argitis and entitled "BOAT PAD FOR BOAT STAND", the entire contents of which is hereby incorporated by reference herein.

BACKGROUND OF THE INVENTION

1. Field of the Invention

The present invention relates generally to a boat pad and/or a boat pad assembly for a boat stand and/or a boat trailer.

2. Description of the Related Art

Conventionally, boat pads for boat stands and/or boat trailers have been constructed with a painted wood platform (approximately 12 in.×12 in. sq.) that is coated (i.e., dip painted). The painted wood surface typically does not provide sufficient protection to boat bottoms. For example, many racing sailboats have epoxy bottoms or bottoms having a wet sanded gel coat. The painted wood pads that contact the boat bottoms typically scratch and/or otherwise damage these boat bottom surfaces. Another problem with the use of wood pads is the limited life expectancy of the pads, since the nature of the material used lends itself to decay over a relatively short period of time and hence requires periodic repair and/or replacement.

In an effort to overcome these problems, boat owners, boat yards and trailer manufacturers have attempted to cover the wood pads with some type of indoor/outdoor carpeting. The problem with using carpeting is that the carpeting acts as a sponge, holding moisture against the boat hull and the wood pad itself. This typically causes the portion of the boat hull or bottom contacting the pad to blister over time, and can expedite the decay process of the wood pad. The replacement of the wood pads thus poses an expensive problem for boat owners and/or users.

Other conventional homemade solutions include gluing various foam strips to the wood pad or cutting up old doormats and gluing the doormat portions to the pads. None of these prior art methods effectively protect the boat bottoms from scratches, blemishes, rub marks and damage. Additionally, none of these prior art solutions effectively prolong the life of the pad itself, with some actually serving to reduce the life of the wood pad.

SUMMARY OF THE INVENTION

An example embodiment of the present invention is directed to a boat pad. The boat pad may include a generally planar member composed of an elastomeric, rubber or like material. The planar member may include a plurality of spaced-apart raised features formed on a surface thereof. The raised features may be configured to contact a surface of a water vessel hull as the hull is being supported by a boat stand or boat trailer including the pad.

Another example embodiment of the present invention is directed to a boat pad assembly. The boat pad assembly may include a boat pad composed of a generally planar member and having a plurality of spaced-apart raised features formed on a facing surface thereof, and a backing plate to which a back surface of the boat pad is attached. The pad and backing plate may form a boat pad assembly that is removably attachable to a boat stand or boat trailer, so that the raised features on the facing surface contact a surface of a water vessel hull as the hull is being supported by the boat stand or boat trailer including the boat pad assembly.

Another example embodiment of the present invention is directed to a boat stand. The boat stand may include a boat pad assembly. The boat pad assembly may comprise a generally planar member having a plurality of spaced-apart raised features formed on a facing surface thereof, and a backing plate to which a back surface of the boat pad is attached. The stand may further include an upper portion to which the boat stand assembly is removably attached, a central support member adapted to support the upper portion with boat pad assembly, and a plurality of support legs extending from the central support member. The boat pad assembly may be oriented so that the raised features on the facing surface contact a surface of a water vessel hull as the hull is being supported by the boat stand.

Another example embodiment of the present invention is directed to a boat trailer. The trailer may include a frame on which wheels are mounted. The frame may include a pair of spaced beams running lengthwise with either side connected by a plurality of cross-bars. A plurality of boat pad assemblies may be arranged in spaced relation and removably attachable to the frame for supporting a water vessel thereon. Each given boat assembly may include a generally flat planar member having a plurality of spaced-apart raised features formed on a facing surface thereof, and a backing plate to which a back surface of the boat pad is attached. Each given boat pad assembly may be oriented so that the raised features on the facing surface contact a surface of a water vessel hull as the hull is being supported by the boat trailer.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

FIG. 1A through 2C illustrate a boat pad and boat pad assembly for use with a boat stand and/or boat trailer in accordance with the example embodiments; these figures should be frequently referred to for the following discussion.

Figure 1A:
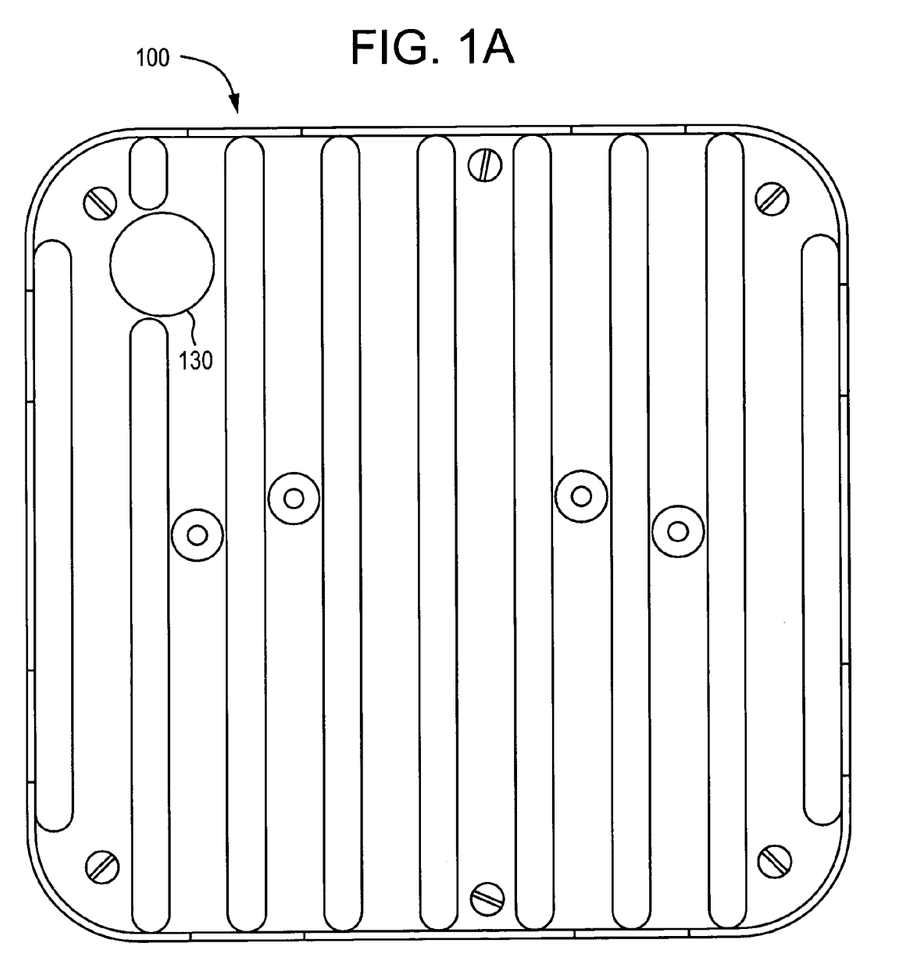
FIG. 1A is a top view of a boat pad assembly for a boat stand or boat trailer, in accordance with an example embodiment of the present invention.
Figure 1B:
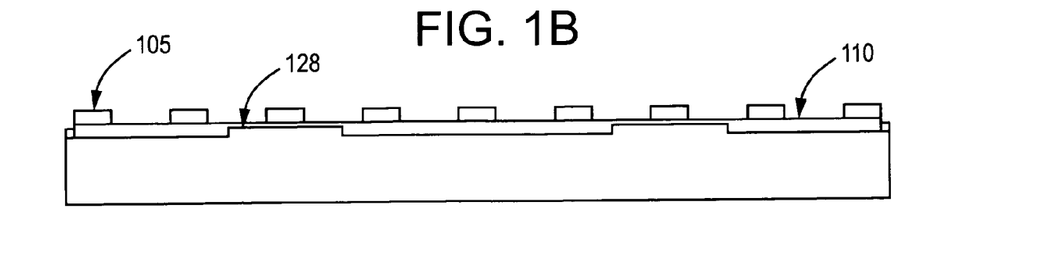
FIG. 1B is a side view of the boat pad assembly of FIG. 1A.
Figure 2A:
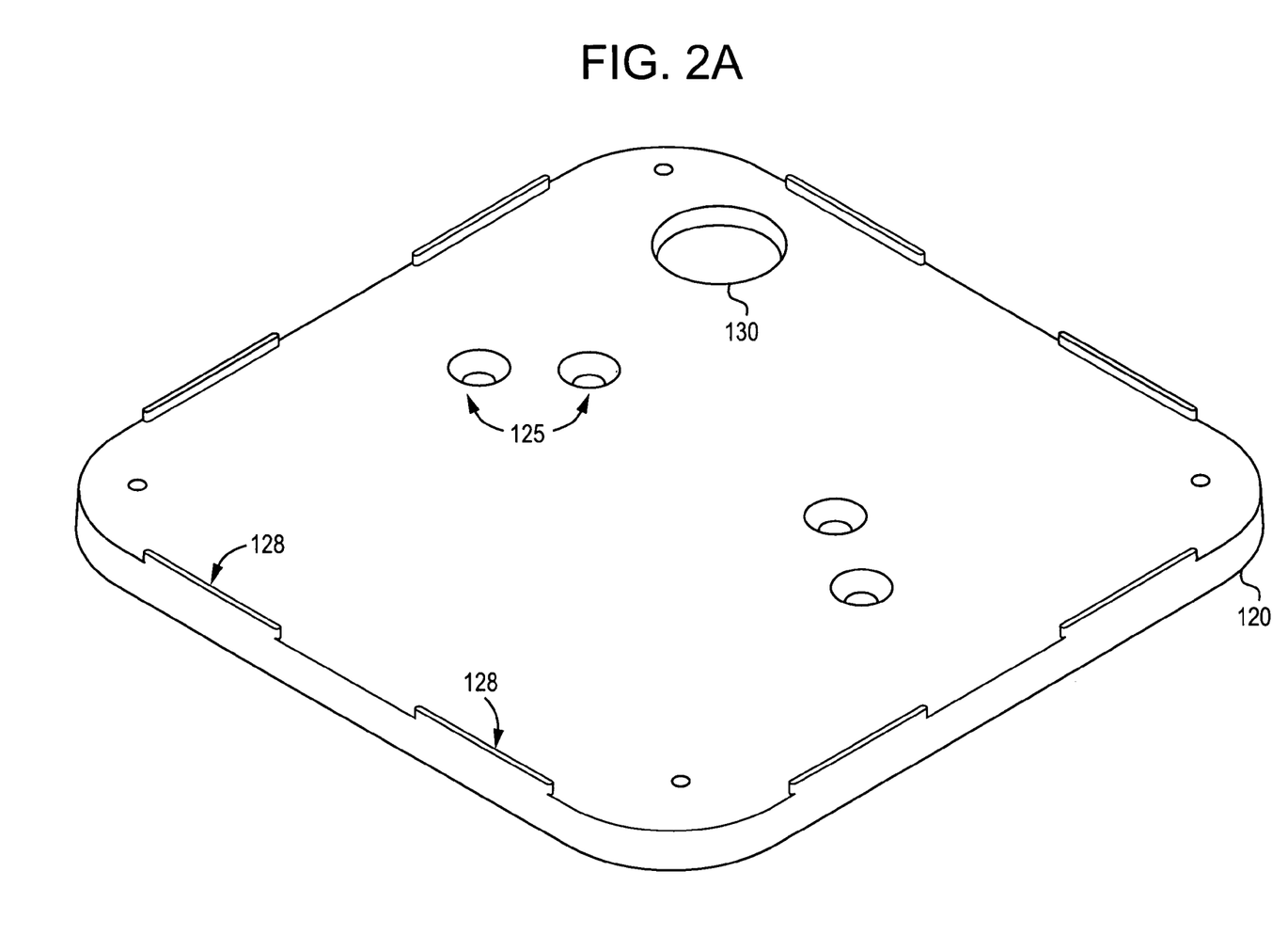
FIG. 2A is a top view of a backing plate configured to receive the boat pad of FIG. 1A.
Figure 2B:
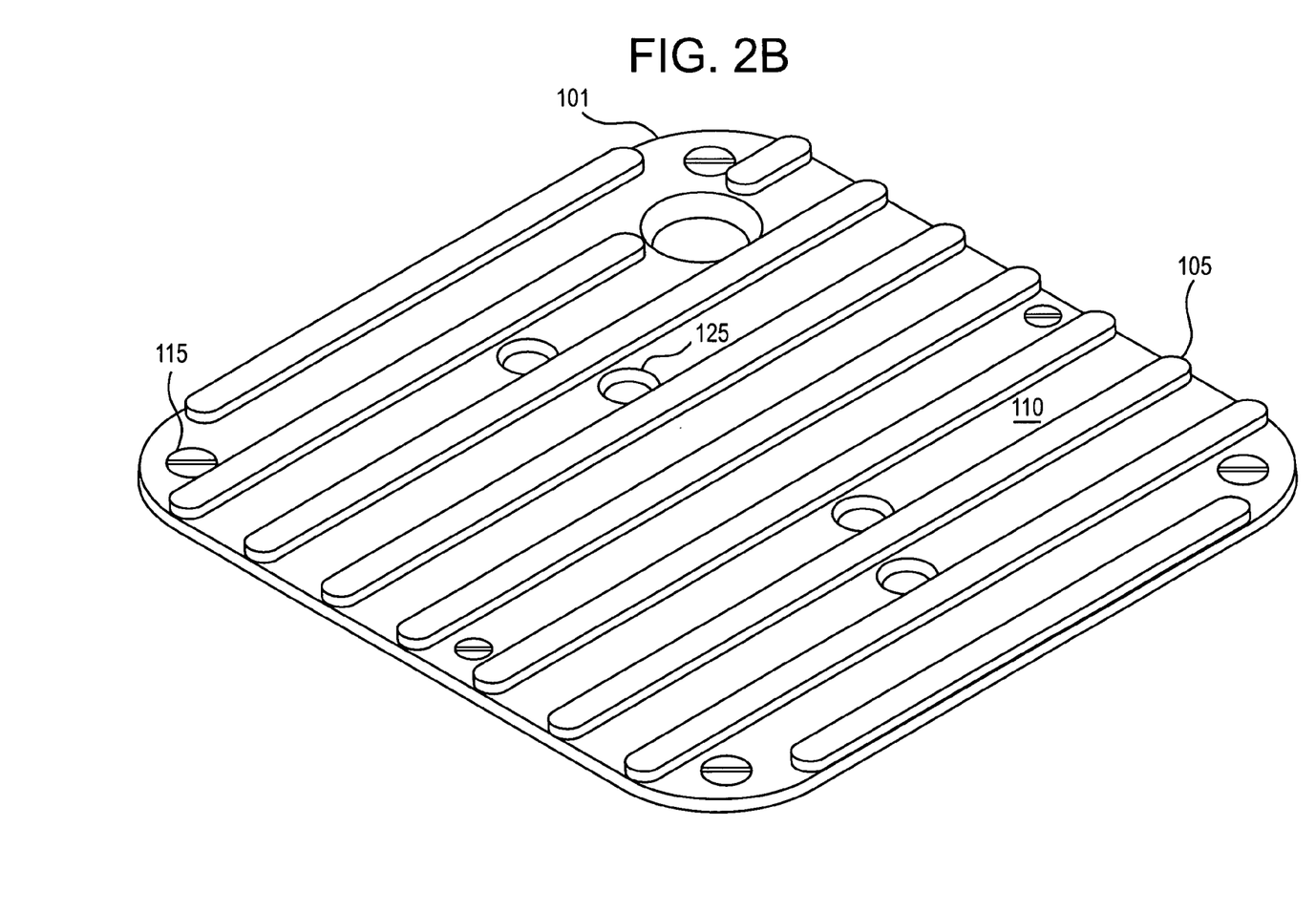
FIG. 2B is a plan view illustrating the example boat pad of the assembly shown in FIGS. 1A and 1B.

Referring to FIG. 2B, there shown is a boat pad 101 which may be configured in any desired size so as to fit on a suitable backing plate member (which forms an upper portion of a typical boat stand, for example). In the example of FIG. 2B, boat pad 101 includes a generally flat planar member, and may include a plurality of raised features or ribs 105 thereon. Ribs 105 may be arranged in parallel in adjacent spaced relation on a surface of the planar member so as extend longitudinally along the pad facing surface, as shown. This arrangement may define a plurality of recesses or channels 110 there between, as shown best in FIG. 1B.

Pad 101 may be ultraviolet resistant and chemical resistant and composed of an elastomeric, rubber or like material. Pad 101 may be formed by an injection molded process. Example processes may include over-molding, insert molding, co-injection molding or multi shot (e.g., two shot) molding. The forming process for pad 101 is not limited to injection molding as other manufacturing methods known to one having ordinary skill in the art, such as die cut, casting, extrusion, etc., may be used to form pad 101.

The boat pad 101 may be attached to a backing plate 120 by any suitable attachment or fastening means 115, shown as screws 115, which also may be configured as adhesives, staples, nails, etc. The attachment may also be accomplished through chemical or mechanical means during fabrication, such as by insert molding, co-injection molding, two shot molding, etc. The screws 115 may extend through bores in the pad 101 and may terminate in threaded channels or terminating bores of a suitable backing plate such as plate 120, or may be fixedly secured to fasteners on the backing plate 120 so as to fixedly attach pad 101 to plate 120, e.g., using lock nuts, etc.

The example boat pad 101 may be designed to protect a boat bottom from scratches, blemishes, rub marks and damage and to prevent moisture from being held against the boat or vessel hull bottom due to the raised features or ribs 105, for example, which limit the amount of surface area of the pad 101 that actually contacts the vessel hull. Additionally, the pad 101 configuration provides channels 110 which may allow any moisture to drain off the pad 101. Moreover as described above, the pad 101 may be ultraviolet resistant and hence protected against solar damage, chemical resistant, and may be formed of an elastomeric, rubber or like material by known injection molding or manufacturing techniques so as to provide greater durability than conventional wood pads, for example.

In another example, the boat pad 101 alone (without backing plate 120) may be easily attachable as a retrofit item to existing boat stands and/or boat trailer pads that use the same (or similar) sized pads, for example. Thus, such a boat pad 101 may be retrofitted to existing boat stands and/or boat trailers, so long as the boat pad 101 dimensions are sized to fit the existing backing plates on those stands, for example. The use of an elastomeric, rubber or like material for the boat pad 101 may extend the life and provide a durable wear-resistant material for a boat stand/trailer, for example.

Figure 2C:
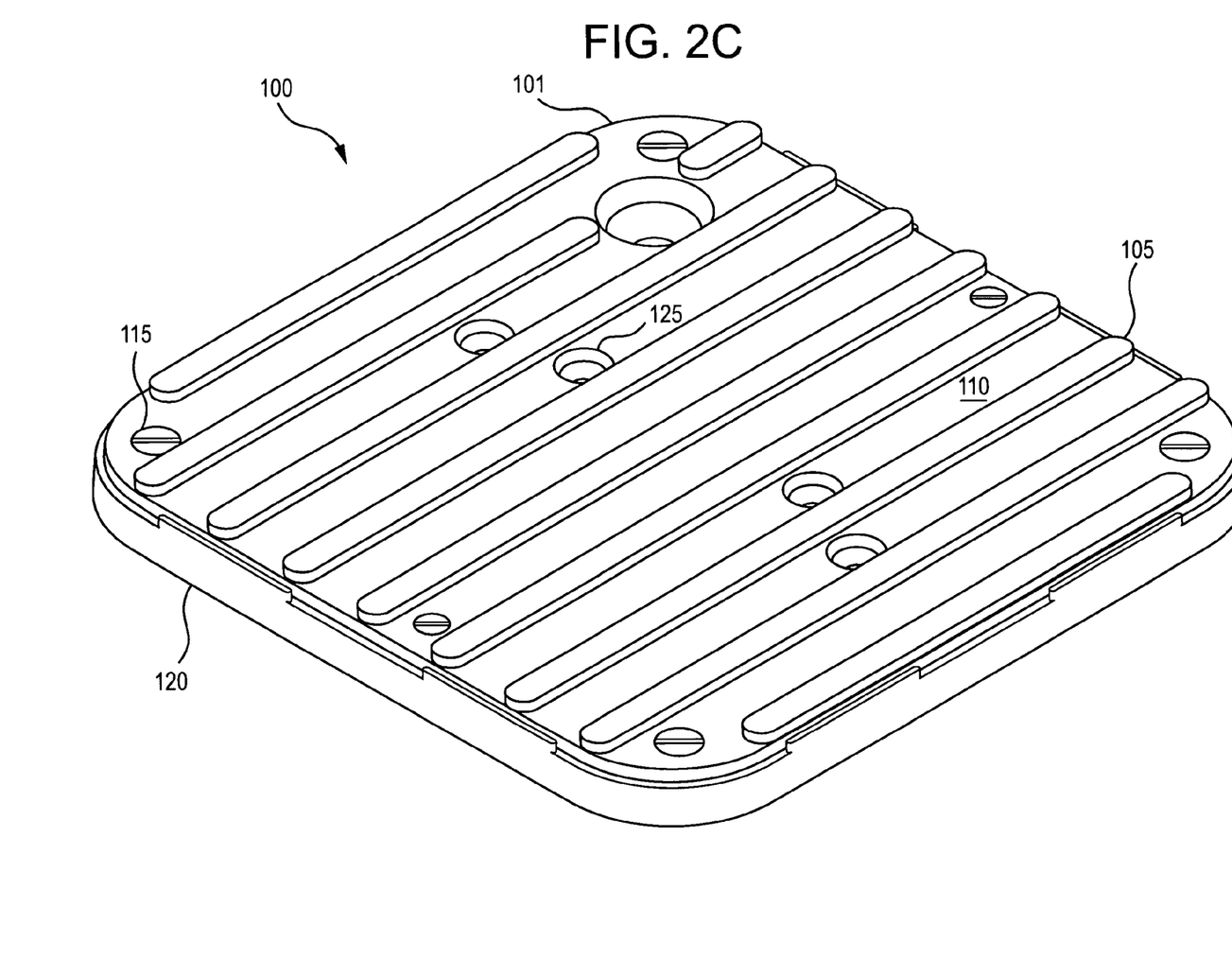
FIG. 2C is a plan view of the example boat pad assembly.

As shown in FIG. 2C, the boat pad 101 may be provided with its own backing plate 120 so as to collectively comprise a boat pad assembly 100. Each of the contiguous pad 101 and backing plate 120 may include centrally located through bores 125 (see FIGS. 2A and 2B, for example). The through bores 125 are adapted to receive mechanical fasteners such as clamp bolts, so as to fixedly secure the boat pad assembly 100 to an upper portion of a boat stand or boat trailer (not shown).

Each of the boat pad 101 and backing plate 120 may further include an aperture 130 of a given diameter. Aperture 130 may be provided in a corner of the contiguous assembly 100, as shown in any of FIGS. 1A and/or 2A–2C, and may be provided for ease of adjustment of the boat stand/trailer height, as to be described in further detail below.

The backing plate 120 may be composed of a hard thermoplastic or thermoset material (or a harder rubber, elastomeric or like material, e.g., having a higher coefficient of hardness which minimizes wear and tear, relative to the material used to form boat pad 101). The material used for backing plate 120 may also be ultraviolet resistant and chemical resistant. Like pad 101, backing plate 120 may be formed by an injection molded process as described above, although the forming process is not limited to injection molding; other manufacturing methods such as die cut, casting, extrusion, etc., may be used to form backing plate 120.

As shown in FIG. 2A, backing plate 120 may include raised protrusions 128 along each of the sides thereof. Protrusions 128 may be configured to bound the pad 101 therein and may contact vertical sides of pad 101, as shown in FIG. 1B. The use of an elastomer-type or rubber pad 101 on a harder thermoplastic or thermoset backing plate 120 may thus provide a boat pad assembly 100 with even further durability, and which may extend the useful life of such an assembly 100 on an upper portion of a boat stand or boat trailer configured with the example boat pad assembly 100. Although the example backing plate 120 may be composed of a thermoplastic or thermoset material, it would be evident to one of ordinary skill in the art that a backing plate made of a wood or metal material may also be used, for example.

Figure 3:
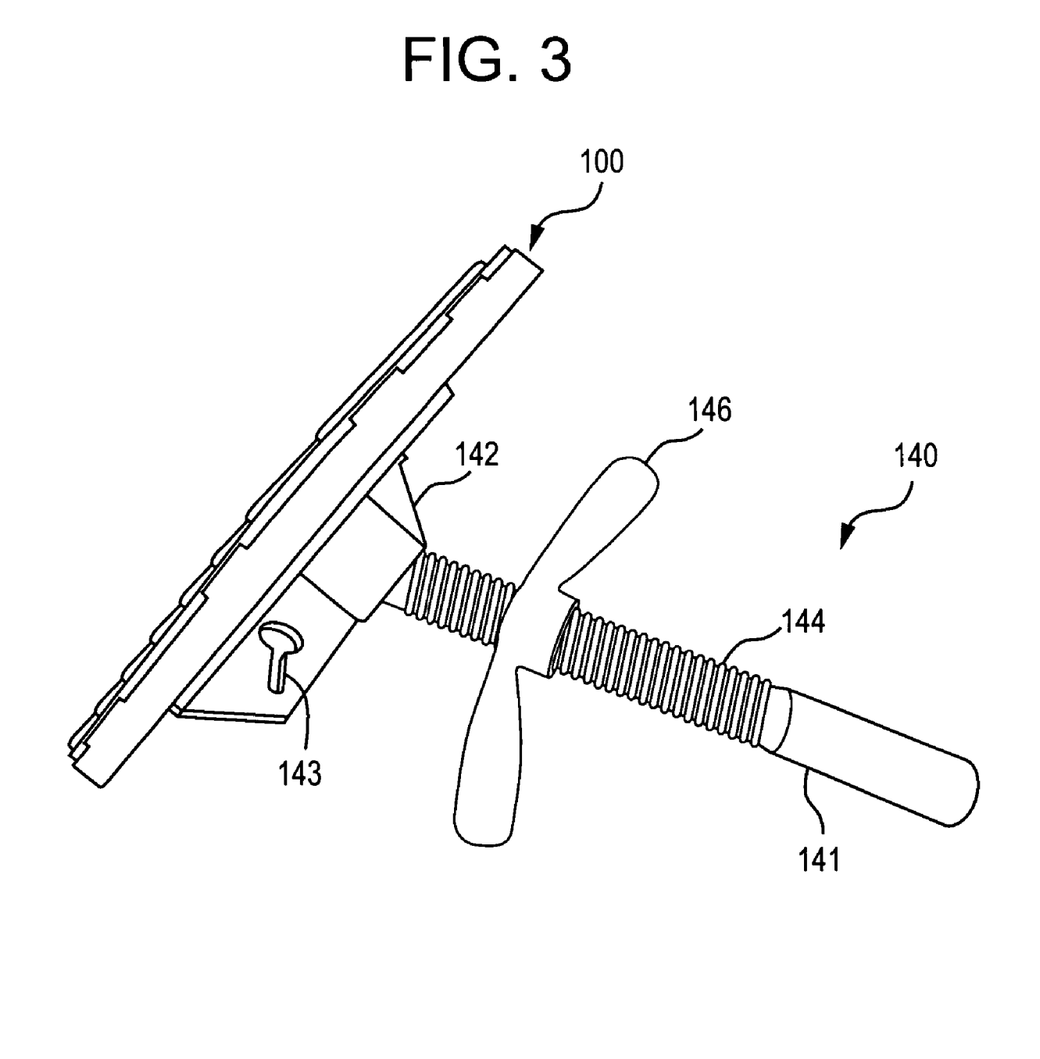
FIG. 3 is a perspective view illustrating attachment of the boat pad assembly to an upper portion of a boat stand, in accordance with an example embodiment of the present invention.
Figure 4:
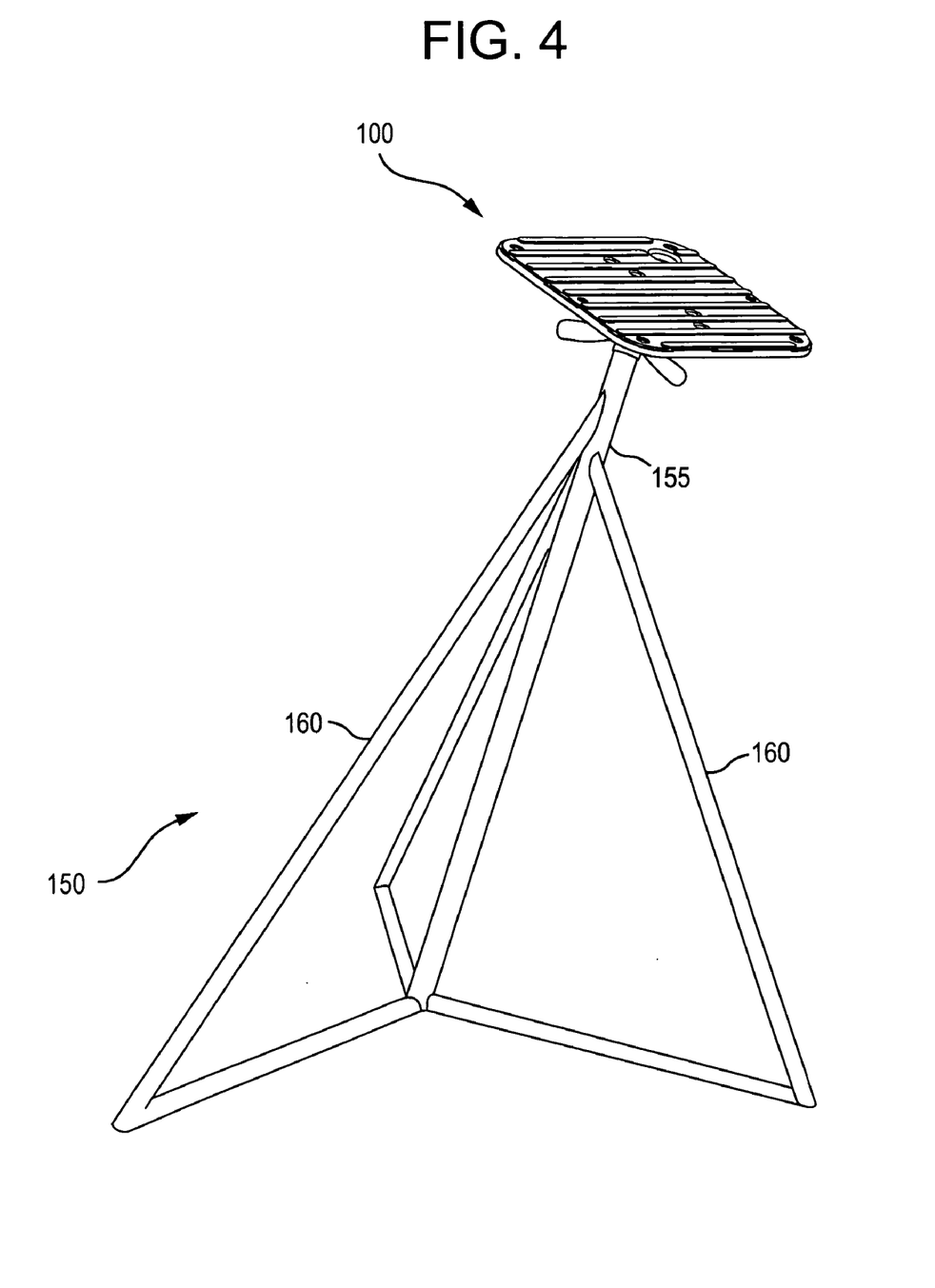
FIG. 4 illustrates an example boat stand configured with the example boat pad assembly as shown in FIGS. 1A–2C.

FIG. 3 is a perspective view illustrating attachment of the boat pad assembly to an upper portion of a boat stand, in accordance with an example embodiment of the present invention, and FIG. 4 illustrates an example boat stand configured with the example boat pad assembly as shown in FIGS. 1A–2C.

As shown in FIG. 3, the boat pad 101 (if retrofitted to an existing backing plate) or the boat pad assembly 100 may be fixedly attached to an upper portion 140 of a boat stand. The upper portion 140 may include an extension rod 141 attached to an angle iron member 142. The extension rod 141 may include threads 144 thereon for engagement with a height adjusting screw 146. The boat pad assembly 100 is attached to the angle iron member 142 by clamp bolts (not shown) extending through the centrally located through bores 125 and secured by suitable mechanical fasteners, and/or terminating in threaded lock channels formed in angle iron member 142. The angle iron member 142 may include an adjustment mechanism 143 which permits the boat pad assembly 100 to be oriented or tilted in the desired plane, and then locked in that position, so as to conform to the shape of the hull it will be supporting, for example.

As shown in FIG. 4, the upper portion 140 with boat pad assembly 100 may be inserted into a recess or hollow opening (not shown for clarity) of a central support member 155 of the boat stand. The boat stand 150 also includes a plurality of supporting legs 160 attached to the central support member 155. The recess may have corresponding threads to engage the threads 144 of the upper portion 140, and the upper portion 140 may be secured to the central support member 155 of the stand 150 by rotating the height adjusting screw 146. Alternatively to adjust the height of the stand 150, once the support portion 140 with boat pad assembly 100 is inserted into the recess of the central support member 155, a user may insert their finger into the aperture 130 and spin the pad assembly 100, which is attached to the extension rod 141 via the angle iron 142, so as to facilitate achieving the desired height of the stand 150.

Figure 5:
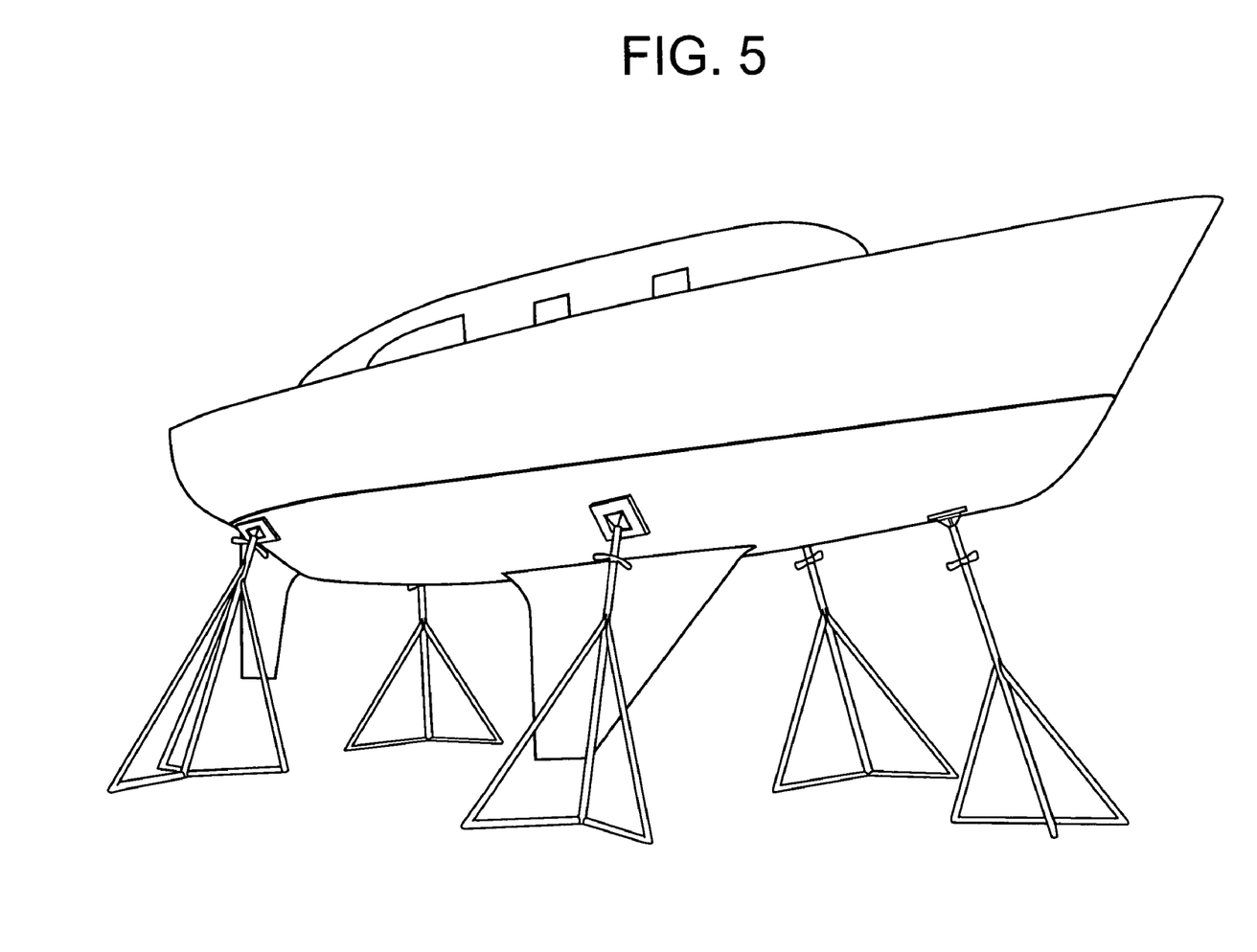
FIG. 5 illustrates an arrangement of boat stands with the example boat pad beneath a water vessel.

FIG. 5 illustrates and arrangement of boat stands with the example boat pad 101 and/or boat pad assembly 100 supporting a water vessel. The example boat pad 101 alone may be retrofitted to existing backing plates of boat stands or boat trailers, and/or a boat stand assembly 100 may be suitably attached to the stands 150. The boat bad assembly 100 can thus be sized to any desired dimensions, with the ribs or raised features 105 formed to any desired size and the spacing or channels 110 there between formed to any desired width, so as to provide a boat pad 101 which protects boat bottoms from scratches, blemishes, rub marks and damage, and which prevents moisture from being held against the boat bottom, for example. As shown in FIG. 5, the example embodiments herein may be applicable to boat stands 150 supporting watercraft having V-shaped hulls, and/or for supporting the bow of a sailboat or other type of watercraft, for example, and may also be applicable to boat trailers configured with truncated boat stands and/or backing plates for boat pads as to be illustrated below.

Figure 6:
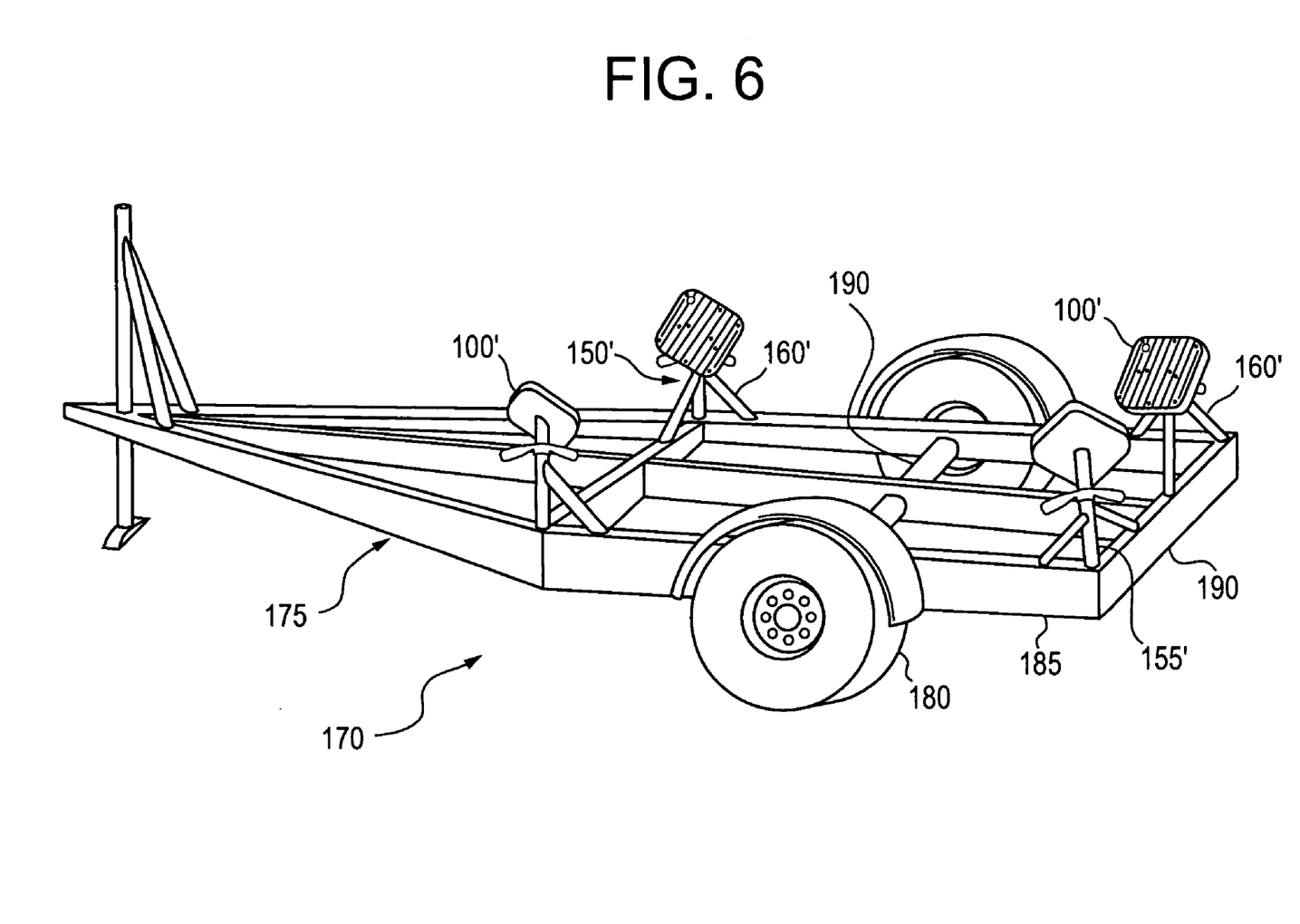
FIG. 6 illustrates an arrangement of the example boat pads and/or boat pad assembly as part of a boat trailer for supporting a water vessel.

FIG. 6 illustrates and arrangement of the example boat pads 101 and/or boat pad assembly 100 as part of a boat trailer for supporting a water vessel. The trailer 170 may include a frame 175 on which wheels 180 are mounted. Beams 185 running lengthwise of the trailer 170 on either side may be connected by transverse cross-bars 190. The beams 185 are generally straight and parallel through the length of trailer 170, converging at their forward ends to complement the general curvature of the bow of the boat, and terminating at a suitable connection (not shown) for a vehicle adapted to tow the trailer 170.

The trailer 170 may include a plurality of boat stands 150' similar in structure to the example stand 150 shown in FIG. 4, and arranged so as to support the weight of a water vessel thereon, as shown in FIG. 6. As an example, and with occasional reference back to FIG. 4, since the same arrangement may be used for a boat trailer 170 but using truncated boat stands 150' attached to the boat trailer frame 175, the upper portion 140 with a given boat pad assembly (shown in FIG. 6 as boat assembly 100') may be inserted into a suitable recess or hollow opening (not shown for clarity) of its corresponding central support member 155' on trailer 170. The individual stands 150' on trailer 170 may also include a plurality of truncated supporting legs 160' attached (e.g., by welding or other like attachment means) to the frame 175 of the trailer 170, such as to beams 185 and/or cross-bars 190. Connection of the boat pad assemblies 100' to their corresponding boat stands 150' and adjustment of individual pad assembly 100' height on the frame 175 of the trailer 170 may be done as shown with respect to FIGS. 3 and 4; thus a detailed explanation herein is omitted for purposes of brevity.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A boat pad, comprising:
   a backing plate; and
   a generally flat planar member disposed on the backing plate and composed of-a rubber or elastomeric material, the planar member having a plurality of spaced-apart raised longitudinally elongated features formed on a pad facing surface thereof which substantially extend from one side to the other side of the planar member, the elongated features configured to contact a surface of a water vessel hull as the hull is being supported by a boat stand or boat trailer including the pad.

2. The boat pad of claim 1, wherein the raised features are embodied as a plurality of parallel-arranged ribs extending longitudinally along the pad facing surface, so as to define a plurality of channels there between.

3. The boat pad of claim 1, wherein the flat planar member may have one of a generally square, rectangular, circular or oval shape.

4. The boat pad of claim 1, wherein the flat planar member is formed by an injection molding process including at least one of an over-molding process, insert molding process and multi-shot molding process.

5. The boat pad of claim 1, further comprising a plurality of through bores arranged along at least two sides of the planar member and configured to receive mechanical fasteners that attach the planar member to a backing plate, the contiguous boat pad and backing plate defining a boat pad assembly that is removably attachable to a boat stand or boat trailer.

6. The boat pad assembly of claim 5, wherein the backing plate is composed of a material selected from one of a metal, wood, thermoplastic and thermoset material.

7. The boat pad of claim 5, wherein the backing plate is composed of a thermoplastic or thermoset material and is formed by an injection molding process including at least one of an over-molding process, insert molding process and multi-shot molding process.

8. The boat pad of claim 5, wherein the planar member and backing plate each include a plurality of centrally-located through bores for receiving mechanical fasteners for attaching the boat pad assembly to a boat stand or boat trailer.

9. The boat pad of claim 5, wherein the planar member and backing plate each include an aperture at a corner thereof that permits the height of the boat stand, or the height of the boat pad assembly on a boat trailer, to be adjusted by inserting a finger into the aperture and spinning the boat pad assembly to raise or lower the height.

10. The boat pad of claim 1, wherein the planar member is composed of an elastomeric material that is ultraviolet resistant and chemical resistant.

11. The boat pad of claim 5, wherein the backing plate is composed of a thermoplastic material that is ultraviolet resistant and chemical resistant.

12. A boat pad assembly, comprising:
   a boat pad configured as a generally flat planar member and having a plurality of spaced-apart raised longitudinally elongated features formed on a facing surface thereof which substantially extend from one side to the other side of the planar member, and
   a backing plate to which a back surface of the boat pad is attached,
   the pad and backing plate forming a boat pad assembly that is removably attachable to a boat stand or boat trailer, so that the raised features on the facing surface contact a surface of a water vessel hull as the hull is being supported by a boat stand or boat trailer including the boat pad assembly.

13. The boat pad assembly of claim 12, wherein the planar member and raised features are composed of a rubber or elastomeric material that is ultraviolet resistant, chemical resistant and formed by an injection molding process including at least one of an over molding process, insert molding process and multi-shot molding process.

14. The boat pad assembly of claim 12, wherein the backing plate is composed of a material selected from one of a metal, wood, thermoplastic and thermoset material.

15. The boat pad assembly of claim 12, wherein the backing plate is composed of a thermoplastic material or a thermoset material that is ultraviolet resistant, chemical resistant and formed by an injection molding process including at least one of an over-molding process, insert molding process and multi-shot molding process.

16. The boat pad assembly of claim 12, wherein the raised features are embodied as a plurality of parallel-arranged ribs extending longitudinally along the pad facing surface, so as to define a plurality of channels there between.

17. The boat pad assembly of claim 12, wherein the boat pad may have one of a generally square, rectangular, circular or oval shape.

18. A boat stand, comprising:
a boat pad assembly including a generally flat boat pad having a plurality of spaced-apart raised longitudinally elongated features formed on a facing surface thereof which substantially extend from one side to the other side of the planar member, and a backing plate to which a back surface of the boat pad is attached;
an upper portion to which the boat stand assembly is removably attached;
a central support member adapted to support the upper portion with boat pad assembly; and
a plurality of support legs extending from central support member,
the boat pad assembly oriented so that the raised features on the facing surface of the boat pad contact a surface of a water vessel hull as the hull is being supported by the boat stand.

19. The boat stand of claim 18, wherein the raised features are embodied as a plurality of parallel-arranged ribs extending longitudinally along the pad facing surface, so as to define a plurality of channels there between.

20. The boat stand of claim 18, wherein the boat pad is composed of a rubber or elastomeric material that is ultraviolet resistant, chemical resistant and formed by an injection molding process including at least one of an over-molding process, insert molding process and multi-shot molding process.

21. The boat stand of claim 18, wherein the backing plate is composed of a material selected from one of a metal, wood, thermoplastic and thermoset material.

22. The boat stand of claim 18, wherein the backing plate is composed of a thermoplastic or thermoset material that is ultraviolet resistant, chemical resistant and formed by an injection molding process including at least one of an over-molding process, insert molding process and multi-shot molding process.

23. A boat trailer, comprising:
a frame on which wheels are mounted, the frame including a pair of spaced beams running lengthwise with either side connected by a plurality of cross-bars; and
a plurality of boat pad assemblies arranged in spaced relation and removably attachable to the frame for supporting a water vessel thereon,
each given boat pad assembly including a generally flat planar member having a plurality of spaced-apart raised longitudinally elongated features formed on a facing surface thereof which substantially extend from one side to the other side of the planar member, and a backing plate to which a back surface of the boat pad is attached, each given boat pad assembly oriented so that the raised features on the facing surface contact a surface of a water vessel hull as the hull is being supported by the boat trailer.

24. The boat trailer of claim 23, wherein the raised features are embodied as a plurality of parallel-arranged ribs extending longitudinally along the pad facing surface, so as to define a plurality of channels there between.

25. The boat trailer of claim 23, wherein the boat pad is composed of a rubber or elastomeric material that is ultraviolet resistant, chemical resistant and formed by an injection molding process including at least one of an over-molding process, insert molding process and multi-shot molding process.

26. The boat trailer of claim 23, wherein the backing plate is composed of a material selected from one of a metal, wood, thermoplastic and thermoset material.

27. The boat trailer of claim 23, wherein the backing plate is composed of a thermoplastic or thermoset material that is ultraviolet resistant, chemical resistant and formed by an injection molding process including at least one of an over-molding process, insert molding process and multi-shot molding process.

* * * * *